M. KIDNOCKER.
Feeder for Corn Shellers, &c.

No. 234,292.                                     Patented Nov. 9, 1880.

WITNESSES.
James B. Lizius.
R. P. Daggett.

INVENTOR.
Morris Kidnocker,
PER
C. Bradford,
ATTORNEY.

N. PETERS, PHOTO-LITHOGRAPHER, WASHINGTON, D. C.

UNITED STATES PATENT OFFICE.

MORRIS KIDNOCKER, OF MUNCIE, INDIANA, ASSIGNOR OF ONE-HALF TO JAMES R. TURNER, OF SAME PLACE.

FEEDER FOR CORN-SHELLERS, &c.

SPECIFICATION forming part of Letters Patent No. 234,292, dated November 9, 1880.

Application filed February 9, 1880.

*To all whom it may concern:*

Be it known that I, MORRIS KIDNOCKER, of the city of Muncie, county of Delaware and State of Indiana, have invented certain new and useful Improvements in Feeders for Corn-Shelling and Grain-Cleaning Machines, of which the following is a specification, reference being had to the accompanying drawings, which are made a part hereof, on which similar letters of reference indicate similar parts, and in which—

Figure 1:
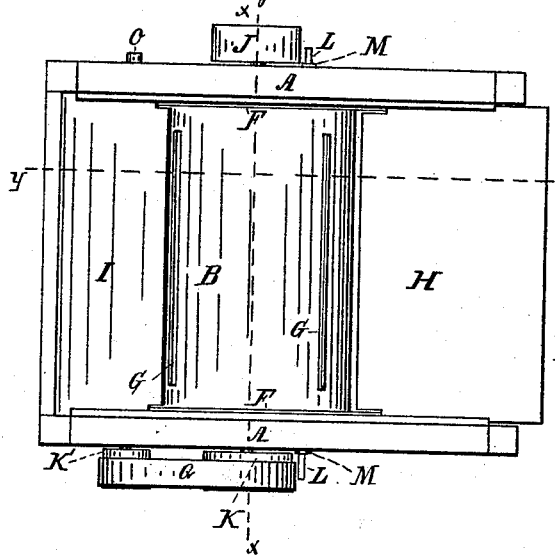
Figure 2:
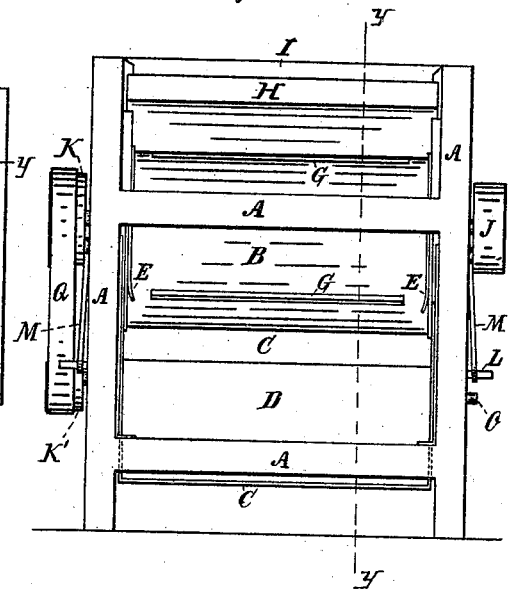
Figure 3:
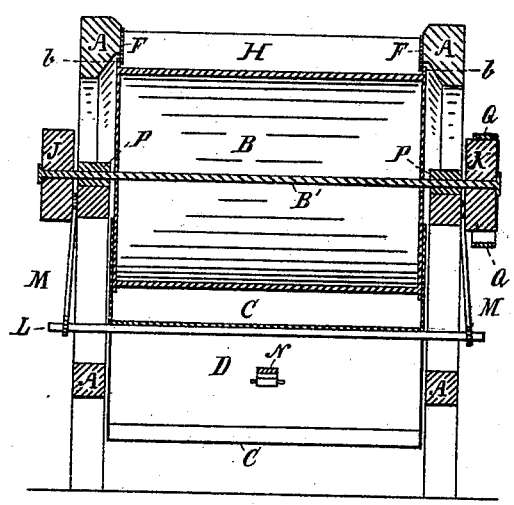
Figure 4:
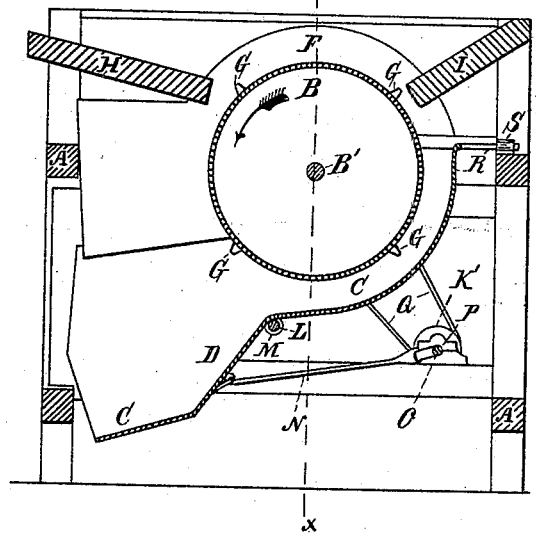

Figure 1 is a top or plan view of my improved feeder; Fig. 2, a rear elevation thereof; Fig. 3, a transverse vertical section looking rearwardly from the dotted line $x\,x$; and Fig. 4, a longitudinal vertical section looking downwardly from the dotted line $y\,y$ in Fig. 1, and to the left from a similar line in Fig. 2.

It has been difficult heretofore to secure that even flow or feed of grain, especially earcorn, to a machine for shelling, cleaning, or separating, which is essential to the perfect operation of such a machine.

It is the object of my invention to produce a machine which will effectually attain this result, and said object is accomplished by the construction and arrangement of parts hereinafter more particularly described.

In the drawings, the portions marked A represent the frame-work of the machine; B, a revolving cylinder having ribs G and flanges $b\,b$; C, a shoe or apron under said cylinder, having a steeply-inclined portion D; E, plates overlapping the sides of said apron, so that no grain can get behind them; F, plates overlapping the flanges $b$ on the ends of the cylinder for a similar purpose; H, an adjustable slide or gate to regulate the amount of grain that shall pass through the machine; I, an inclined piece placed close to the opposite side of the cylinder from the gate H to keep the grain from descending on that side; J, a pulley on the cylinder-shaft B', by which the machine is driven; K, a pulley on the other end of the cylinder-shaft; O, a crank-shaft having a pulley, K', which is connected by a belt, Q, to the pulley K; N, a connecting-rod from the crank-shaft O to the apron C, through which motion is imparted to said apron. L are rods or projections from the under side of the apron, and which, through the vibrating rods M, are connected with and supported by the framework; R, sliding rods attached to the upper end of the apron, and passing through bearings S on the frame-work A.

The operation of my machine is as follows: The slide or gate H is secured at a point which leaves a sufficient opening between it and the cylinder B. A conveyer-spout or other means is then employed to conduct the grain or corn into the hopper-like space about the top of said cylinder. The cylinder is then made to revolve in the direction of the arrow, and carries with it such portion of the grain as will pass through the opening, which, as before intimated, is adjusted to suit the capacity of the machine into which the grain is to be delivered. The projections G upon the cylinder aid in securing an even flow of the passing grain. The shoe or apron C is provided to receive the grain as it falls from the cylinder, and is provided with a sharply-inclined portion, D, arranged in proper relation to the cylinder, against which the grain first strikes, and is thereby given an impetus in the direction of its final delivery from this machine. This apron is suspended by hanger-rods M and sliding rods R, and is given a reciprocating motion by the connecting-rod N and crank-shaft O, which latter is preferably driven by a suitable belt-and-pulley connection with the shaft B' of the cylinder B.

The cylinder may be made of circular form, as shown, or may be polygonal or other shaped. The cylinder alone, with the adjustable gate, would measurably answer my purpose, but it is much better when combined with the apron, as shown.

Having thus fully described my said invention, what I claim as new, and desire to secure by Letters Patent, is—

1. The combination, in a feeder for corn-shelling or grain-cleaning machines, of the frame A, adjustable side H, drum or cylinder B, having longitudinal ribs G, and reciprocating apron C, having inclined face D, all substantially as shown and specified.

2. In combination with a revolving cylinder, a reciprocating apron having a part of its surface steeply inclined, as at D, substantially as and for the purposes set forth.

In witness whereof I have hereunto set my hand and seal, at Muncie, Indiana, this 4th day of February, A. D. 1880.

MORRIS KIDNOCKER. [L. S.]

In presence of—
  JAMES R. TURNER,
  NATHAN H. LONG.